(No Model.)
G. R. BASSETT.
BICYCLE TIRE.
No. 487,596. Patented Dec. 6, 1892.
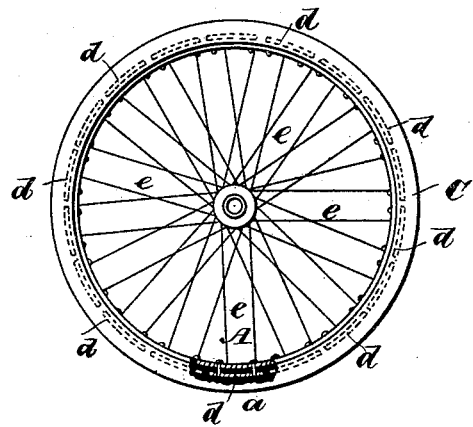
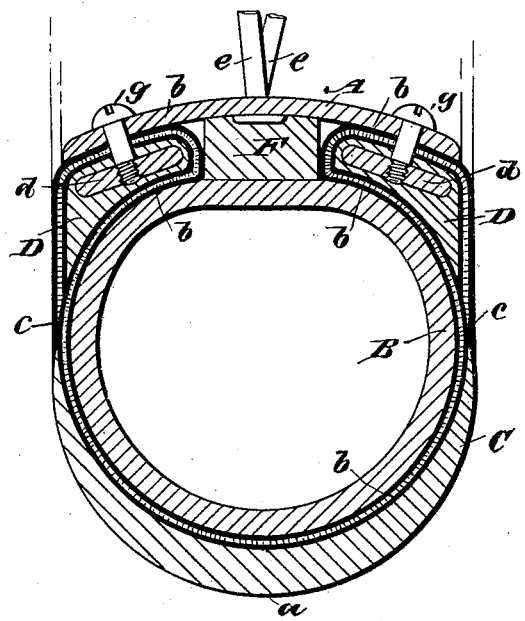
WITNESSES:
H. Walker
C. Sedgwick
INVENTOR
G. R. Bassett
BY
Munn
ATTORNEYS.

ial cushion-rings D are provided,
UNITED STATES PATENT OFFICE.

GEORGE R. BASSETT, OF NEW YORK, N. Y.

BICYCLE-TIRE.

SPECIFICATION forming part of Letters Patent No. 487,596, dated December 6, 1892.

Application filed March 7, 1892. Serial No. 424,036. (No model.)

*To all whom it may concern:*

Be it known that I, GEORGE R. BASSETT, of New York city, in the county and State of New York, have invented a new and useful Improvement in Bicycle-Tires, of which the following is a full, clear, and exact description.

This invention relates to improvements in pneumatic bicycle-tires, wherein a tubular inner shell of elastic material is protected by a tread-piece or shoe held in place upon the tubular ring and both secured upon the wheel-rim.

The object of my invention is to provide an improved detachable shoe or tread-piece for a tire of the type indicated, and also to provide improved means for the detachable connection of the tread-piece with a wheel-rim, so as to facilitate the attachment and removal partly or entirely of the tread-piece when this is desired, a further object being to adapt portions attached to the shoe by their peculiar construction to cushion the impact of the edge of the wheel-rim, so as to prevent injury to the inner pneumatic tire, which it is liable to sustain from percussion in service.

To these ends my invention consists in the construction and combination of parts, as is hereinafter described and claimed.

Reference is to be had to the accompanying drawings, forming a part of this specification, in which similar letters of reference indicate corresponding parts in both of the figures.

Figure 1 is a side view of a bicycle-wheel having the improvement and broken away to expose the interior construction; and Fig. 2 is a transverse section of the tire seated upon a wheel-rim enlarged, showing the improvements.

In the drawings, A is the wheel-rim, and B the continuous tubular tire that in service is filled with air and hermetically sealed to provide an elastic cushion. Upon the exterior of the tire B a peculiarly-constructed tread-piece C is placed, which is formed substantially as follows: The crown $a$ of the tread-piece is diminished in thickness as it approaches the sides of the tire B, and on the inner surface is coated with a stout canvas lining $b$, that is firmly secured to it. Separate slightly-elastic cushion-rings D are provided, which are nearly triangular in cross-section, their faces nearest to the tire B having a concave form in cross-section, which adapts said surfaces to conform to the cylindric wall of the tire B, as indicated in Fig. 2.

The rings D are designed to fill up the space between the cylindric wall of the tire B and the concavity of the wheel-rim A and by their intermediate position serve as cushions to absorb the shock and prevent injury to the tire proper. To this end a sufficient thickness is given to the portions of the wings that intervene between the tire and rim, and the face of each ring that rests upon the rim is shaped to fit upon it.

The canvas lining $b$ is continued as an envelope around each cushion-ring D and joins the part projected beyond the inner surface of the tread-piece C at $c$, where the junction is rendered substantial and water-tight.

Within the cushion-rings D at a proper distance apart a series of metal clamping-plates $d$ is embedded when said rings are formed, these metal plates conforming in curvature longitudinally with that of the rings they are placed within, so as to become themselves sectional rings that are rendered flexible by their division into pieces.

The wheel-spokes $e$ are secured by any preferred means to the rim A, and opposite the spokes an elastic center ring F is located, the width and thickness of which are proportioned to that of the cushion-rings D, so that it will fill up the space between the hollow tire B, wheel-rim A, and cushion-rings, the latter being thus maintained in a proper position, and the tire also.

The wheel-rim is perforated at proper intervals for the introduction of clamping-screws $g$, that enter opposite threaded perforations in the clamping-plates $d$. It will be seen that the adjustment of the screws $g$ along and near to each side edge of the wheel-rim A will draw the tread-piece C closely upon the pneumatic tire B, and when from wear or other cause it is desirable to remove a part or the entire tread-piece this can be quickly effected by displacement of the screws $g$.

The peculiar manner in which the reinforcing canvas lining $b$ is applied and firmly secured to the inner surface of the tread-piece and as an envelope upon the cushion-rings serves to unite the parts in a substantial manner.

It will be evident that the spacing-ring F will protect the tire B from injury that might result if it could have contact with the inner ends of the spokes e, and, furthermore, that the cushion-rings D will absorb shock from the edges of the rim, and thus protect the wall of the tire opposite said points, while the tread-piece C receives the wear due to contact with a road-bed in service.

Having thus fully described my invention, I claim as new and desire to secure by Letters Patent—

1. In a bicycle-tire, the combination, with a wheel-rim, of a pneumatic tire, a tread-piece thereon, two separate cushion-rings between the rim and tire, and a fibrous envelope around the cushion-rings and between the tread-piece and pneumatic tire, substantially as described.

2. In a bicycle-tire, two cushion-rings connected with a tread-piece by a fibrous lining-piece that envelops the cushion-rings, substantially as described.

3. In a bicycle-tire, the combination, with a wheel-rim, of a pneumatic tire, a tread-piece thereon, two cushion-rings, a fibrous lining-piece secured on the inner side of the tread-piece and around the cushion-rings, a spacing-ring, and means to clamp the tread-piece and cushion-rings about the tire and upon the wheel-rim, substantially as described.

4. In a bicycle-tire, two cushion-rings provided with a series of clamping-plates embedded within, a tread-piece connected therewith by a fibrous lining, a spacing-ring, and a cylindric tire which is air-tight and enveloped by the tread-piece lining, spacing-ring, and cushion-rings, all held upon a wheel-rim, substantially as described.

5. In a bicycle-tire, the combination, with a wheel-rim perforated near each edge in series and a spacing-ring seated centrally on the rim, of a pneumatic tire on the spacing-ring, a tread-piece on the tire, a fibrous lining between the tire and tread-piece and secured to said tread-piece, two cushion-rings, one each side of the spacing-ring and enveloped by the lining-piece, a series of clamping-plates embedded in each cushion-ring, having threaded perforations opposite the holes in the wheel-rim, and clamping-screws loosely inserted in the rim-holes and having threaded engagement with the tapped holes in the clamping-plates, substantially as described.

GEORGE R. BASSETT.

Witnesses:
JAMES E. GUMAER,
E. C. PRESCOTT.